United States Patent
Stolle

(10) Patent No.: US 7,760,672 B2
(45) Date of Patent: Jul. 20, 2010

(54) METHOD AND DEVICE FOR THE ECHO COMPENSATION OF A RECEPTION SIGNAL

(75) Inventor: Reinhard Stolle, Neufahrn (DE)

(73) Assignee: Infineon Technologies AG, Munich (DE)

( * ) Notice: Subject to any disclaimer, the term of this patent is extended or adjusted under 35 U.S.C. 154(b) by 1208 days.

(21) Appl. No.: 11/343,242

(22) Filed: Jan. 30, 2006

(65) Prior Publication Data
US 2006/0239578 A1    Oct. 26, 2006

(30) Foreign Application Priority Data
Jan. 31, 2005    (DE) .................. 10 2005 004 369

(51) Int. Cl.
*H04B 3/20* (2006.01)
(52) U.S. Cl. ..................... 370/286; 370/201
(58) Field of Classification Search ........... 370/201, 370/286, 287, 288, 289, 290, 291
See application file for complete search history.

(56) References Cited

U.S. PATENT DOCUMENTS

| | | | | |
|---|---|---|---|---|
| 5,272,695 A | * | 12/1993 | Makino et al. | 370/291 |
| 6,192,126 B1 | * | 2/2001 | Koski | 379/406.14 |
| 6,259,680 B1 | * | 7/2001 | Blackwell et al. | 370/286 |
| 6,956,944 B1 | * | 10/2005 | Koren | 379/406.01 |
| 7,215,764 B2 | * | 5/2007 | Apfel | 379/399.01 |
| 7,496,618 B2 | * | 2/2009 | Brown et al. | 708/404 |
| 2005/0099967 A1 | * | 5/2005 | Baba | 370/286 |

FOREIGN PATENT DOCUMENTS

| | | |
|---|---|---|
| EP | 1 422 878 A2 | 5/2004 |
| JP | 2004023773 A | 1/2004 |

* cited by examiner

*Primary Examiner*—Ricky Ngo
*Assistant Examiner*—Christine Ng
(74) *Attorney, Agent, or Firm*—Maginot, Moore & Beck

(57) ABSTRACT

A method and a device are provided for the echo compensation of a reception signal, a transmission signal being composed of a plurality of transmission subsignals which are generated in a corresponding plurality of signal paths, and a transmission combination signal, which corresponds to a combination of the plurality of transmission subsignals, being delivered to an echo compensation filter in order to generate the echo compensation signal from it. The distribution of the transmission signal may be carried out by distributing of a frequency bandwidth of the transmission signal between a plurality of frequency bands. The method and the device are designed inter alia for the processing of xDSL signals, in particular VDSL2 signals.

20 Claims, 2 Drawing Sheets

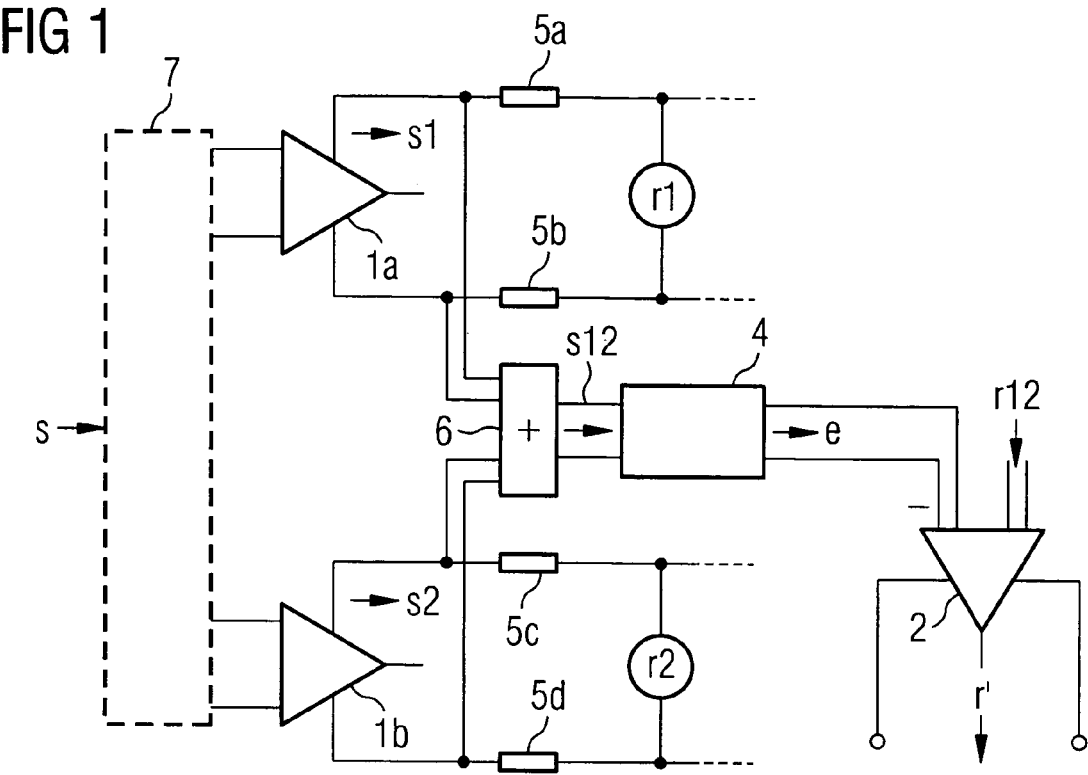
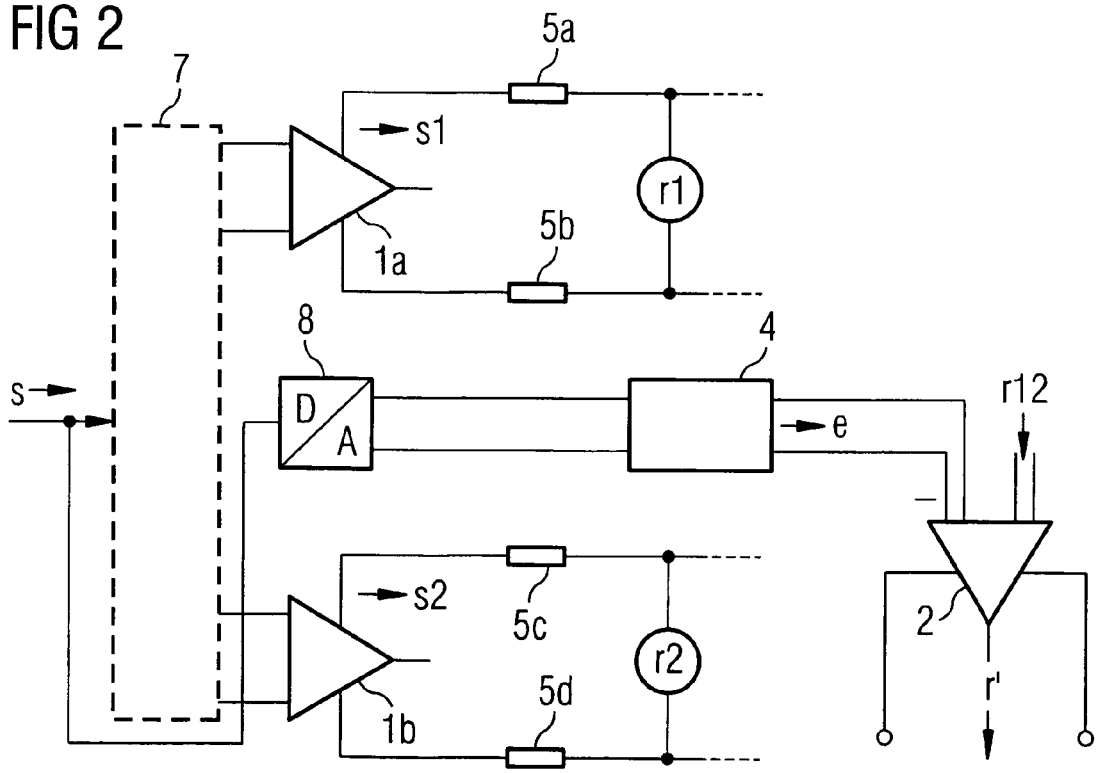

METHOD AND DEVICE FOR THE ECHO COMPENSATION OF A RECEPTION SIGNAL

FIELD OF THE INVENTION

The present invention relates to a method and a device for the echo compensation of a reception signal, to which end an echo component caused by a transmission signal in the reception signal is replicated by an echo compensation filter (also referred to as a "hybrid filter" or "B filter"). In particular, the invention relates to such a device and such a method for the echo-compensation of an xDSL reception signal ("Digital Subscriber Line").

BACKGROUND

The development of DSL technology is aimed at a constantly increasing signal bandwidth. In the VDSL2 ("Very high-speed DSL") standardization process, a maximum transmission bandwidth of 30 MHz beyond the bandwidth already known from the ADSL ("Asymmetric DSL") standard is intended. The development of analogue front ends for such bandwidths is generally a challenge, since the performance requirements for VDSL2 are based on the same model of the line noise at −140 dBm/Hz as that used for narrower bandwidths, such as ADSL (1.1 MHz), ADSL2+ (2.2 MHz), SHDSL (600 kHz) ("Symmetric High-Bitrate DSL") or VDSL1 (12 MHz). Echo compensation filters are also employed, for example, in xDSL transceivers and there particularly in the analogue front end, in order to replicate the echo component caused by the transmission signal in the reception signal so that the transmission signal component in the reception signal can then be reduced.

Such electrical echoes often occur in so-called "4-wire-to-2-wire" hybrid circuits, since these cannot achieve complete separation of the reception and transmission paths. The conventional methods are based on a linear model for replicating the echo.

In VDSL, most echo signal components are compensated for by VDSL techniques, for example by FDD ("Frequency Division Duplex") and digital duplex. Even here, however, the nonlinear echo components cause a deterioration of the performance features. On the one hand, the out-of-band distortion caused by nonlinearities influences the reception signal and, on the other hand, the in-band nonlinearities influence the signal-to-noise ratio at the far end.

Nonlinear echo components can be reduced by using nonlinear echo compensators. These use adaptive methods based on memoryless and memory-related models for the nonlinearities. Adaptive polynomial characteristics inter alia are used as an approach for the former case and adaptive Volterra filters in the second case. Since in particular the use of Volterra filters entails a very large number of system parameters to be modeled, the efficient realization of Volterra filters is still in development.

FIG. 4 represents a method and a device for echo compensation according to the prior art. In this case, a transmission signal s is delivered to a line driver 1, and a reception signal r is applied via a transmitter 3. The line driver and the transmitter are respectively connected to ohmic terminating impedances 5a, 5b connected in series. On the line driver-output side, the amplified transmission signal is tapped and delivered to an echo compensation filter 4, which replicates the echo component caused by the transmission signal s in the reception signal r. An echo compensation signal e determined in this way and the reception signal r tapped from the transmitter 3 are delivered to a combination means 2, which may be designed as a differential amplifier, so as to obtain an echo-compensated reception signal r' with a reduced echo component, to which end the echo compensation signal e is subtracted from the reception signal r.

Owing to a large bandwidth in xDSL applications, and particularly in VDSL2 applications, the problem may arise that the signal is not merely delivered via a signal path through the transceiver but distributed between a plurality of signal paths. To this end, a separate echo compensation filter must be provided in each individual signal path, which entails increased material and production costs as well as a higher power consumption of the overall component.

SUMMARY

It is therefore an object of the present invention to provide a method and device for the echo compensation of a reception signal in particular for broadband signals, for example VDSL2 signals, which are distributed between a plurality of signal paths, an echo compensation signal which replicates an echo component caused by the transmission signal in the reception signal being generated from a transmission signal with the aid of an echo compensation filter.

This object is achieved by a method and a device according to at least some embodiments of the invention.

Some embodiments of the invention relate to a method and a device for the echo compensation of a reception signal, a transmission signal being composed of a plurality of transmission subsignals which are generated in a corresponding plurality of signal paths. According to the invention a transmission combination signal, which corresponds to a combination of the plurality of transmission subsignals, is delivered to the echo compensation filter. By using only a single echo compensation filter for a plurality of signal paths, the present invention is advantageous in respect of the material and production costs as well as the power consumption of transceiver components, for example for VDSL2 applications. These advantages are shared by all the exemplary embodiments described below.

According to a preferred exemplary embodiment, a signal bandwidth of the transmission signal is distributed between a plurality of frequency bands which are assigned to the individual signal paths, a line driver for signal amplification or signal conditioning being arranged in each signal path. From the transmission subsignals of the individual signal paths, which are tapped on the line driver output side, a transmission combination signal is formed and delivered to an echo compensation filter, in order to determine the echo component of the transmission combination signal in a reception combination signal, which is formed by a combination of the reception subsignals tapped from the individual signal paths. The echo compensation signal and the reception combination signal are combined to form a reception signal which contains a reduced echo component.

Conversely to this, the transmission combination signal in an alternative preferred exemplary embodiment is not determined from the combination of the transmission subsignals of the individual signal paths but instead, before splitting into the individual signal paths, the input transmission signal is tapped directly and delivered to the echo compensation filter. This advantageously further reduces the costs and the power consumption of the overall component, since it obviates the outlay and proportionate power consumption of the combination means for combining the individual transmission subsignals of the signal paths to form the transmission combination signal.

A D/A converter may additionally be arranged before or after the echo compensation filter in another preferred exemplary embodiment, which simplifies the processing of digital transmission and reception signals. In the case of D/A conversion before the echo compensation filter, signal buffering may also be provided between the D/A converter and the echo compensation filter. In this way, for example, xDSL signals and in particular VDSL2 signals can be processed by the method according to the invention and the device according to the invention.

Although the invention is preferably applicable to xDSL signals, and in this context particularly to VDSL2 signals, the invention may in principle be applied to any type of transmission signals which are composed of a plurality of subsignals.

The present invention will be explained in more detail below with reference to the appended drawings with the aid of preferred exemplary embodiments.

BRIEF DESCRIPTION OF THE DRAWINGS

FIG. 1 shows a block diagram of a first exemplary embodiment of the present invention for the echo compensation of a reception signal, a transmission combination signal being formed as the input signal for the echo compensation filter from two transmission subsignals of two corresponding signal paths, FIG. 2 shows an alternative variant of FIG. 1 in which a transmission signal, which is tapped before the distribution between the individual signal paths, is used as the input signal for the echo compensation filter, a D/A converter also being functionally arranged before the echo compensation filter.

DETAILED DESCRIPTION

Figure 3:
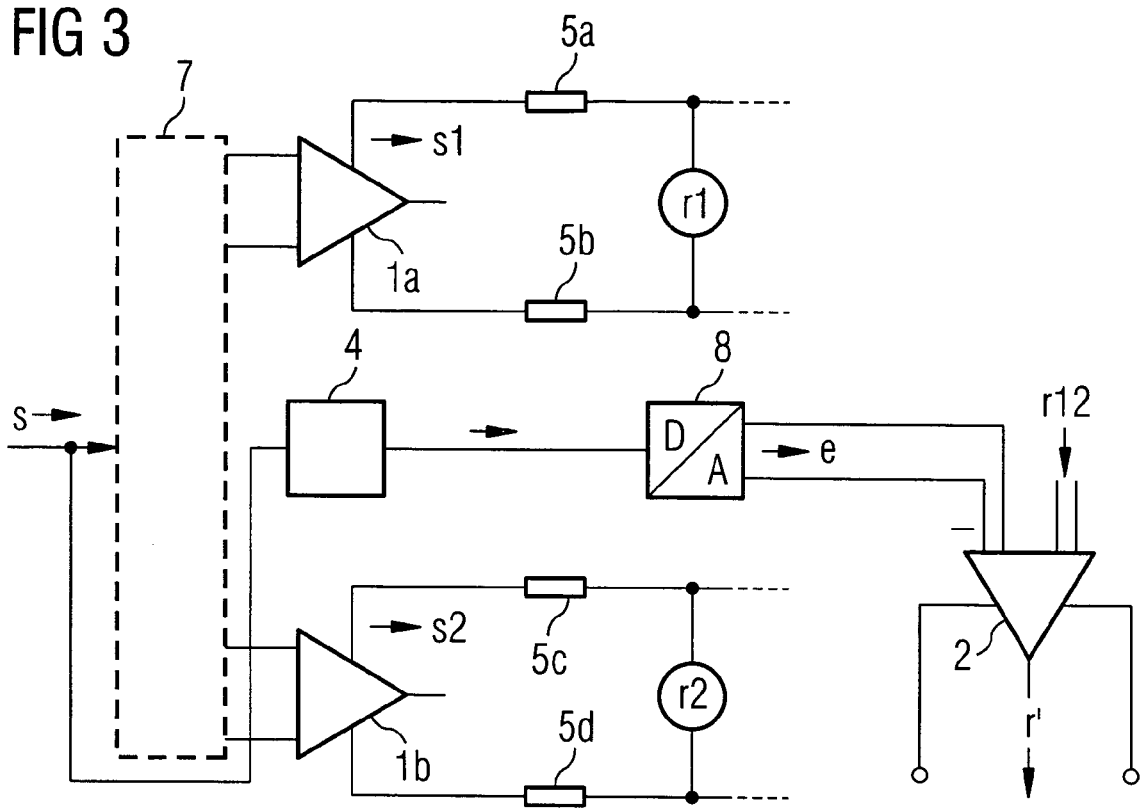
FIG. 3 shows an alternative variant of FIG. 2, the D/A converter being arranged after the echo compensation filter.
Figure 4:
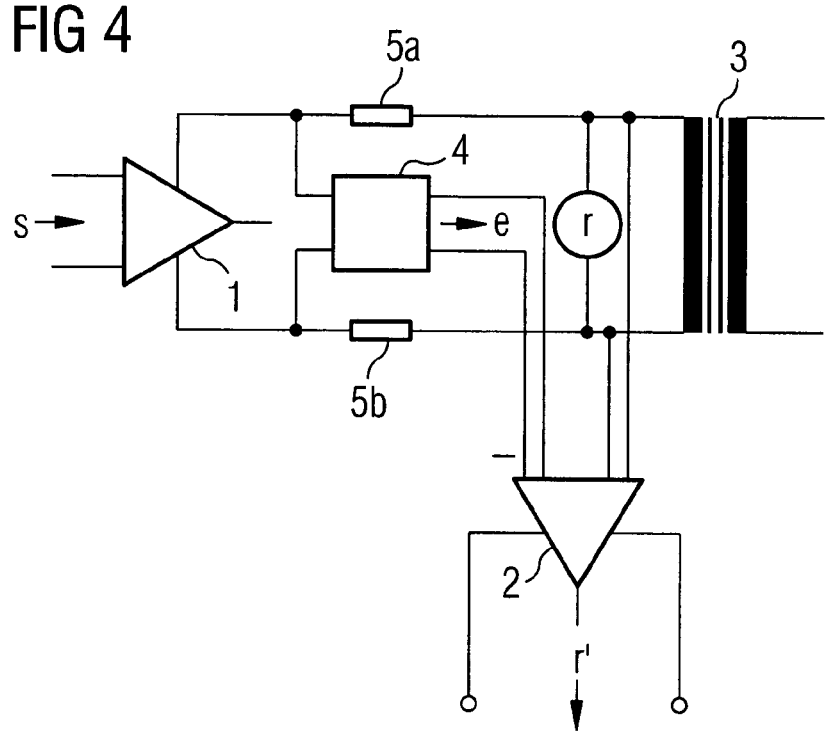
FIG. 4 shows a block diagram of a separate arrangement for the echo compensation of a reception signal for a signal path according to the prior art.

FIG. 1 represents an exemplary embodiment of an echo compensation device according to the invention, for an xDSL transceiver whose transmission section comprises two signal paths. Since broadband VDSL2 signals (30 MHz) are to be transmitted by such a transceiver, for example, corresponding measures must be implemented in order inter alia to ensure a linear response of the circuit. One way of doing this is to subdivide the frequency bandwidth of a VDSL2 transmission signal s into a plurality of frequency bands, each frequency band being delivered over a separate signal path through the transceiver. There is a line driver $1a$, $1b$ adapted for the corresponding frequency in each signal path, so as to carry out signal amplification or signal adaptation respectively for a transmission subsignal. By controlled adaptation of the line drivers $1a$, $1b$ to the frequency band of the corresponding transmission subsignal, it is possible to achieve an improved linearity response of the circuit compared with a circuit having only one line driver path.

The distribution of the VDSL2 transmission signal s may be carried out by corresponding filters. In this case, the opportunity is available firstly to convert the digital transmission signal s into an analogue signal by a D/A converter, before it is delivered to the filters for distribution into the individual frequency bands.

Similarly to this, the respective amplified or adapted transmission subsignals in each signal path are delivered to a further filter which essentially has the same transmission range as that before the line driver $1a$, $1b$ in the same signal path. The individual transmission subsignals are subsequently combined, which may for example be done as an adder functionality, and applied by a transmitter onto a transmission link. Alternatively, the transmitter functionality may also be implemented by arranging one transmitter per signal path after the respective filter, and not combining the transmission subsignals until after this.

Besides the task of applying the transmission signal onto the transmission link, the transmitters also have the task of extracting the reception signal r from the transmission link. A procedure corresponding to the remarks about the distribution of the transmission signal s is also adopted with the reception signal r, so that a reception subsignal $r1$, $r2$ can be tapped from each signal path.

A more detailed function description of the distribution and combination of the VDSL2 transmission signal s and the VDSL2 reception signal r, and of the application onto and extraction from the transmission link by means of transmitters, is not necessary for understanding the invention. Merely the fact that the transmission signal s is distributed between a plurality of transmission subsignals $s1$, $s2$, and the reception signal r is distributed between a plurality of reception subsignals $r1$, $r2$, is important in what follows. Transmitters and frequency band filters are therefore not represented in FIGS. 1-3 according to the invention. The distribution of the transmission signal s is symbolized by a distribution means 7 standing for the corresponding filters.

As shown in FIG. 1, with the aid of the distribution means 7 which may be configured as a multiplexer, the transmission signal s is distributed between two transmission subsignals $s1$, $s2$ which are delivered to the corresponding signal paths. This distribution is probably carried out by distributing the frequency bandwidth of the transmission signal s between two frequency bands, each transmission subsignal $s1$, $s2$ being assigned to a different frequency band of the transmission signal s. The transmission subsignal is delivered to the line driver $1a$, $1b$ in each signal path, so that the amplified transmission subsignals $s1$ and $s2$ are available on the line driver output side. On the output side of the line drivers $1a$, $1b$, ohmic terminating impedances $5a$-$5d$ are respectively connected in series in the direction of the transmitters (not shown). The transmission subsignals $s1$ and $s2$ are tapped between the respective line driver output $1a$, $1b$ and the associated ohmic terminating impedance $5a$-$5d$, in which case the transmission subsignals $s1$ and $s2$ can generally be obtained at positions where there is no superposition of the reception signal. The transmission subsignals $s1$, $s2$ are delivered to a combination means 6, preferably configured as an adder, which generates a transmission combination signal $s12$ from them.

Reception subsignals $r1$, $r2$ can correspondingly be tapped from each signal path, behind the ohmic terminating impedances in the transmitter direction, and combined to form a reception combination signal $r12$. As an alternative to this, instead of a reception combination signal $r12$, it is also possible to directly use a reception signal r (not shown) which can be tapped before the distribution (not shown) of the reception signal.

The transmission combination signal $s12$ is delivered to an echo compensation filter 4, which replicates an echo component caused by the transmission combination signal $s12$ in the reception combination signal $r12$ or the reception signal r, and delivers an echo compensation signal e on the output side. The echo compensation filter 4 may also be configured as a general hybrid ("replica" or "B filter").

In a combination means 2, which is preferably configured as a differential amplifier provided with a variable gain factor, the echo compensation signal e is combined with the reception combination signal r12 or the reception signal r so as to generate an echo-compensated reception signal r' which contains a reduced echo component. It is also possible to integrate the combination function of the reception subsignals r1, r2 into the combination means 2, or the differential amplifier. Any suitable linear combination of the reception signal with the echo compensation signal is generally conceivable, depending on the respective application, so long as the echo component contained in the reception signal can thereby be reduced or suppressed.

This exemplary embodiment achieves a reduction of the material and production costs and the power consumption of the overall component, compared with an embodiment according to the prior art, since only one echo compensation filter 1 is needed overall in order to replicates the echo component of the transmission signal s in the reception signal r in the present invention, instead of one echo compensation filter per signal path.

Only the differences from FIG. 1 will be presented in the following description of FIG. 2 and FIG. 3, with reference to the reference numerals and the components of FIG. 1. To this extent, the explanations of FIG. 1 also apply in FIG. 2 and FIG. 3.

FIG. 2 represents an alternative embodiment of FIG. 1. In contrast to the exemplary embodiment in FIG. 1, here the transmission subsignals s1, s2 of the two transmission paths are not tapped in order to be delivered with the aid of the combination means 6 as a transmission combination signal s12 to the echo compensation filter 4 as an input signal. The transmission signal s, which contains the entire signal information, is instead tapped before the distribution means 7 and delivered via a D/A converter 8 to the echo compensation filter 4. For proper operation of the circuit, a buffer functionality should be connected between the D/A converter 8 and the echo compensation filter 4. This may nevertheless preferably be integrated in the D/A converter.

As a further advantage, the exemplary embodiment of FIG. 2 can save on the cost and power outlay for the combination means 6 in FIG. 1. Furthermore, owing to the D/A converter, it is also possible to process digital signals which are present in the form of an xDSL signal or a VDSL2 signal, for example.

FIG. 3 represents an alternative variant of FIG. 2. The D/A converter 8 is arranged functionally after the echo compensation filter 4 here, i.e. the digital transmission signal s is delivered directly to the echo compensation filter 4 and the digital echo compensation signal e generated by the echo compensation filter 4 is delivered to the D/A converter 8. The analogue echo compensation signal e is available at the D/A converter 8. A digital echo compensation filter can advantageously be used in this way. With such an interchanged arrangement of the echo compensation filter 4 and the D/A converter 8, this approach is also referred to as a "$2^{nd}$ D/A converter".

Compared with the circuit according to FIG. 1, the circuits according to FIG. 2 and FIG. 3 have the disadvantage that the nonlinearities of the line drivers 1a, 1b are not yet present in the transmission signal s so that, when it is delivered directly into the echo compensation filter 4, they cannot be taken into account there.

The invention claimed is:

1. A method for the echo compensation of a reception signal, comprising:
generating an echo compensation signal which replicates an echo component caused by a transmission signal in the reception signal, the transmission signal composed of a plurality of transmission subsignals generated in a corresponding plurality of signal paths, the echo compensation signal being generated from a first signal using an echo compensation signal, the first signal corresponding to a combination of the plurality of transmission subsignals, and
obtaining an echo-compensated reception signal with a reduced echo component by combining the echo compensation signal with the reception signal, wherein a frequency bandwidth of the transmission signal is distributed into a plurality of frequency bands, each frequency band assigned to a corresponding one of the plurality of signal paths.

2. The method according to claim 1, further comprising signal conditioning the transmission subsignals in each of the plurality of signal paths using line drivers.

3. The method according to claim 1, wherein the frequency bandwidth of the transmission signal is composed of individual frequency bands of the transmission subsignals.

4. The method according to claim 1, wherein obtaining the echo-compensated reception signal further comprises forming a reception combination signal from a plurality of reception subsignals and combining the reception combination signal with the echo compensation signal.

5. The method according to claim 1, wherein the first signal constitutes the transmission signal before distribution of the transmission signal into the transmission subsignals.

6. The method according to claim 1, wherein the first signal constitutes the transmission signal converted to an analog signal prior to being provided to an echo compensation filter.

7. The method according to claim 1, wherein the echo compensation signal is digitally generated and subsequently converted into an analog echo compensation signal, before the analog echo compensation signal is combined with the reception signal.

8. The method according to claim 1, wherein the transmission subsignals are combined by addition to form the first signal.

9. The method according to claim 1, wherein obtaining an echo-compensated reception signal further comprises obtaining a difference between the reception signal and the echo compensation signal.

10. The method according to claim 1, wherein the reception signal comprises an xDSL signal.

11. The method according to claim 10, wherein the reception signal comprises a VDSL2 signal.

12. An arrangement configured to provide echo compensation of a reception signal, comprising:
an echo compensation filter which generates, from a first signal, an echo compensation signal which replicates an echo component caused by a transmission signal in the reception signal, the transmission signal composed of a plurality of transmission subsignals, which are generated in a corresponding plurality of signal paths, the first signal corresponding to a combination of the plurality of transmission subsignals;
a combination device configured to combine the echo compensation signal with the reception signal in order to form an echo-compensated reception signal with a reduced echo component; and a distribution unit configured to distribute a frequency bandwidth of the transmission signal between a plurality of frequency bands assigned to the individual signal paths.

13. The arrangement according to claim 12, further comprising line drivers configured to provide signal conditioning of individual transmission subsignals in each of the plurality of signal paths.

14. The arrangement according to claim 12, wherein the combination device is configured to form the reception subsignals with a reduced echo component from the echo compensation signal and a reception combination signal, the reception combination signal formed from reception subsignals tapped from individual signal paths.

15. The arrangement according to claim 12, further comprising a D/A converter operably coupled to convert a digital echo compensation signal generated by the echo compensation filter to an analog echo compensation signal, and to provide the analog echo compensation signal to the combination device.

16. The arrangement according to claim 12, further comprising a distribution unit configured to distribute the transmission signal among the plurality of signal paths corresponding to the individual transmission subsignals.

17. The arrangement according to claim 12, further comprising an adder device configured to generate the first signal from the transmission subsignals.

18. The arrangement according to claim 12, wherein the combination device is configured to generate the echo-compensated reception signal based on a difference between the reception signal and the echo compensation signal.

19. The arrangement according to claim 12, wherein the reception signal comprises an xDSL signal.

20. The arrangement according to claim 19, wherein the reception signal comprises a VDSL2 signal.

\* \* \* \* \*